July 13, 1948.  W. F. FISCHER  2,444,925
CONTAINER WASHING MACHINE
Filed July 25, 1940  13 Sheets-Sheet 3

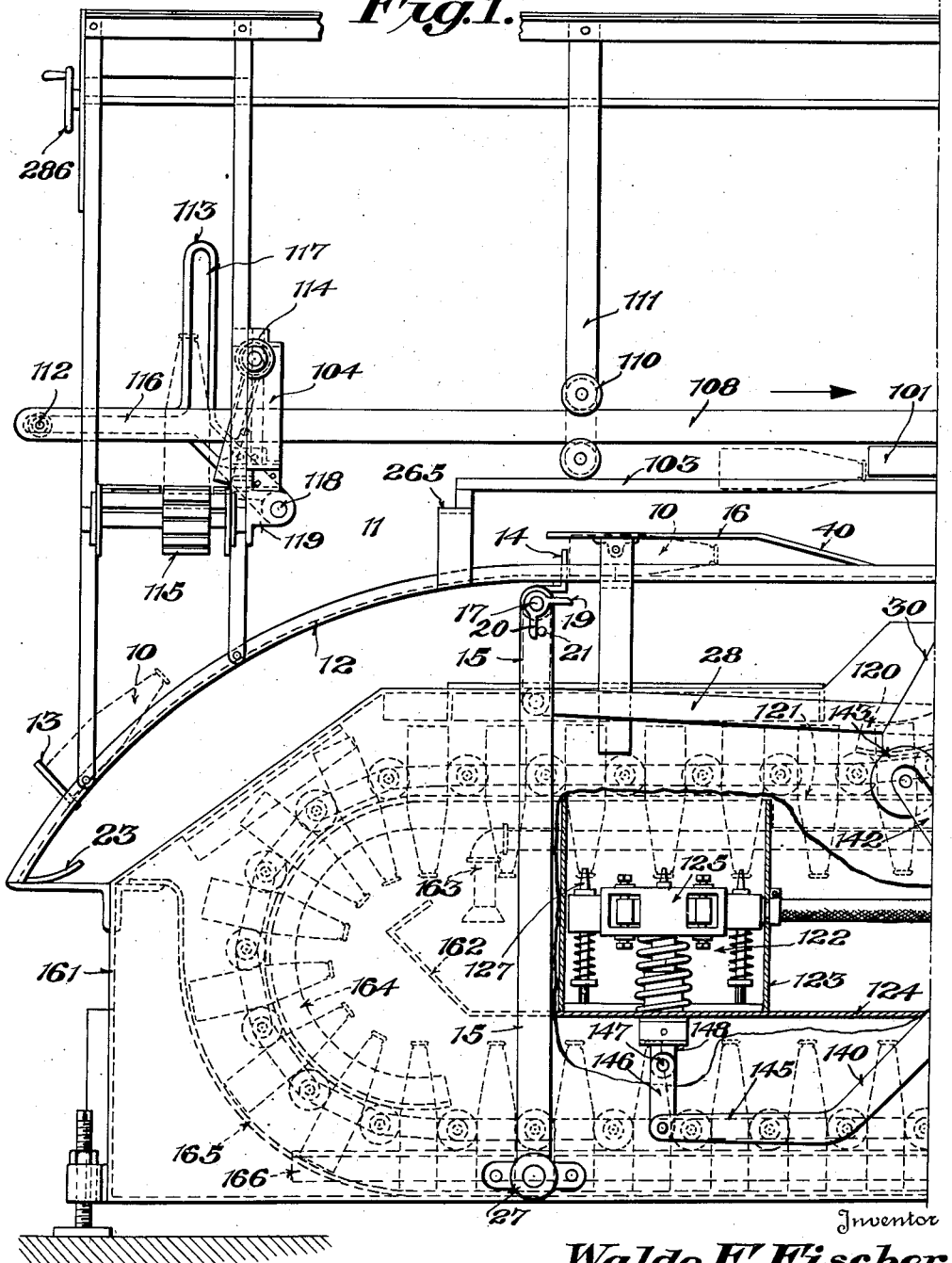

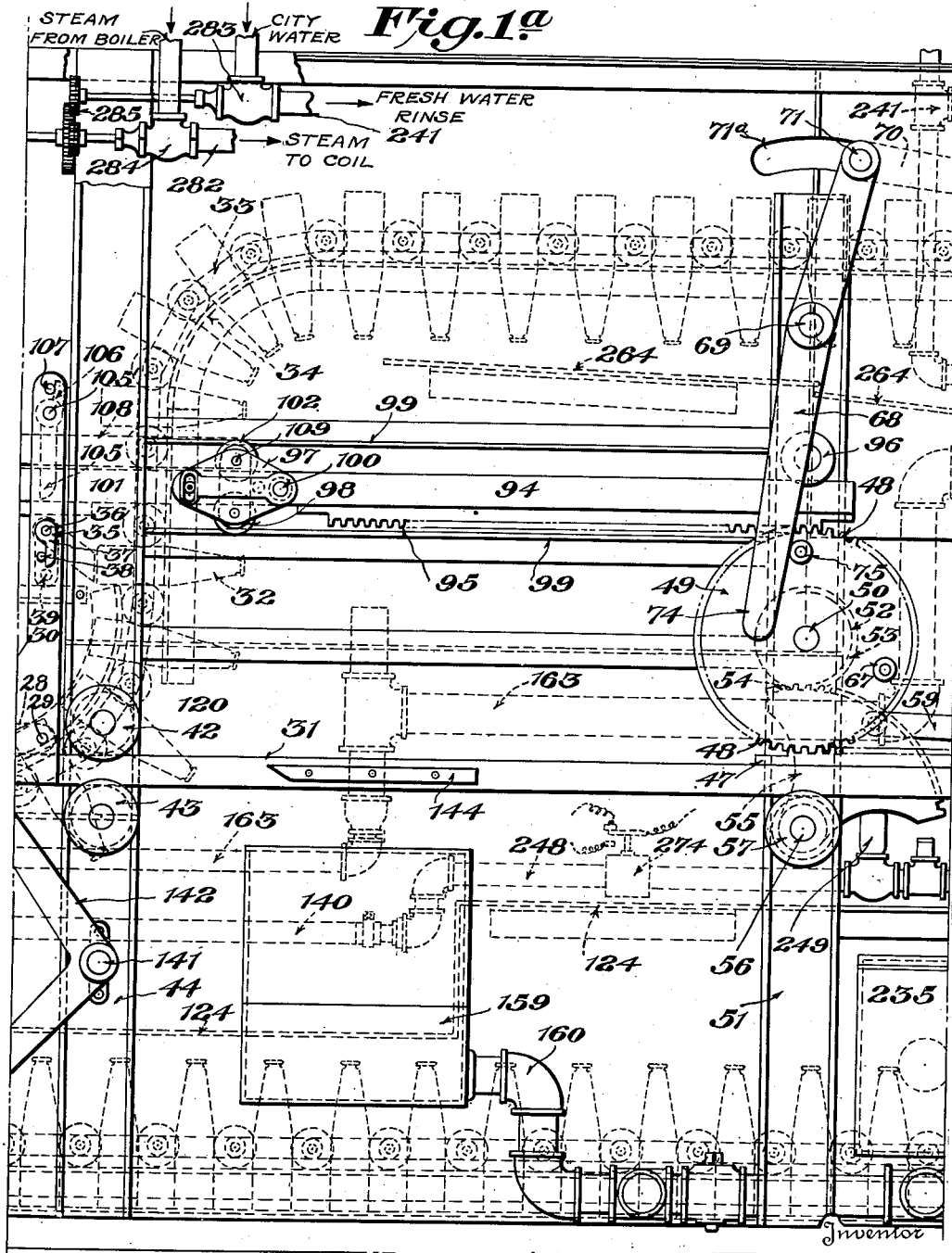

Inventor
Waldo F. Fischer
By Charles W. Hills
Attorneys

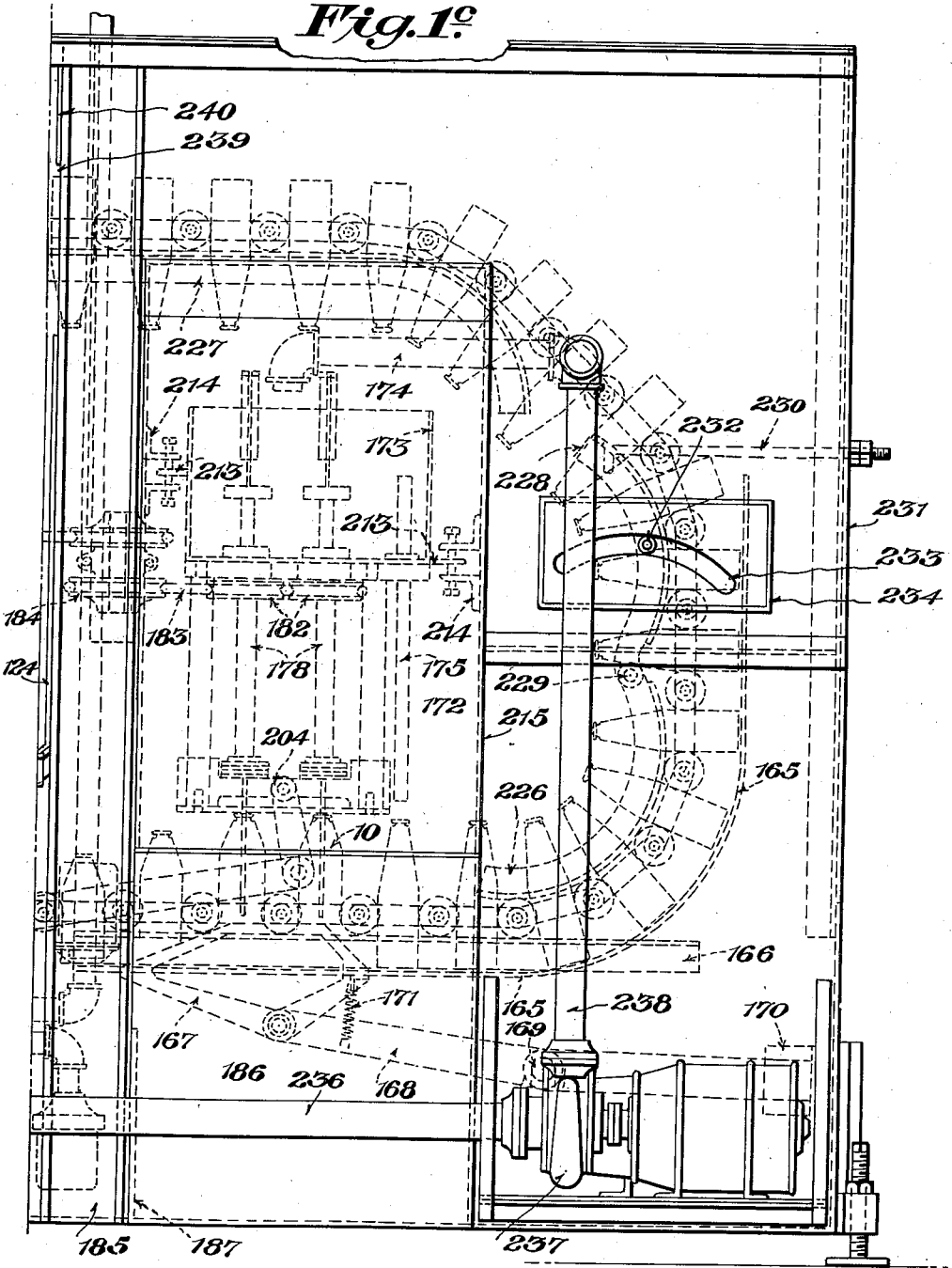

July 13, 1948. W. F. FISCHER 2,444,925
CONTAINER WASHING MACHINE
Filed July 25, 1940 13 Sheets-Sheet 5
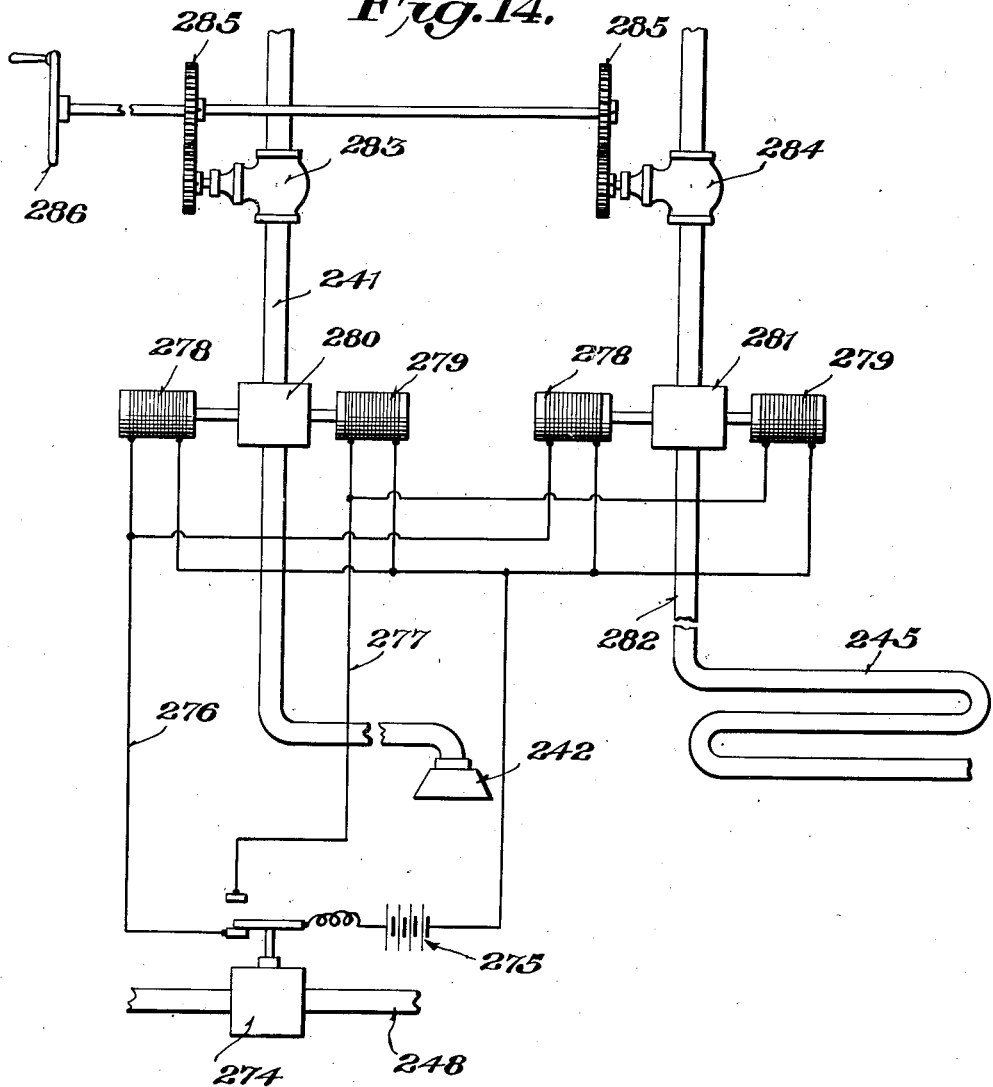
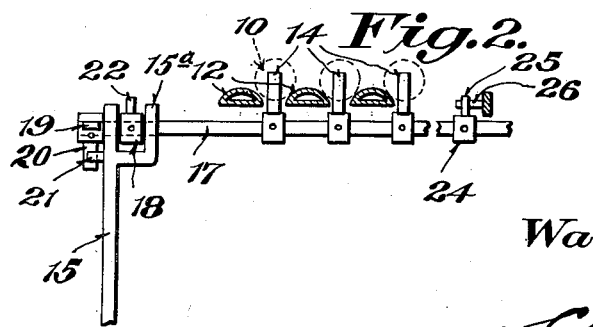
Inventor
Waldo F. Fischer,
By Charles Hills
Attorneys

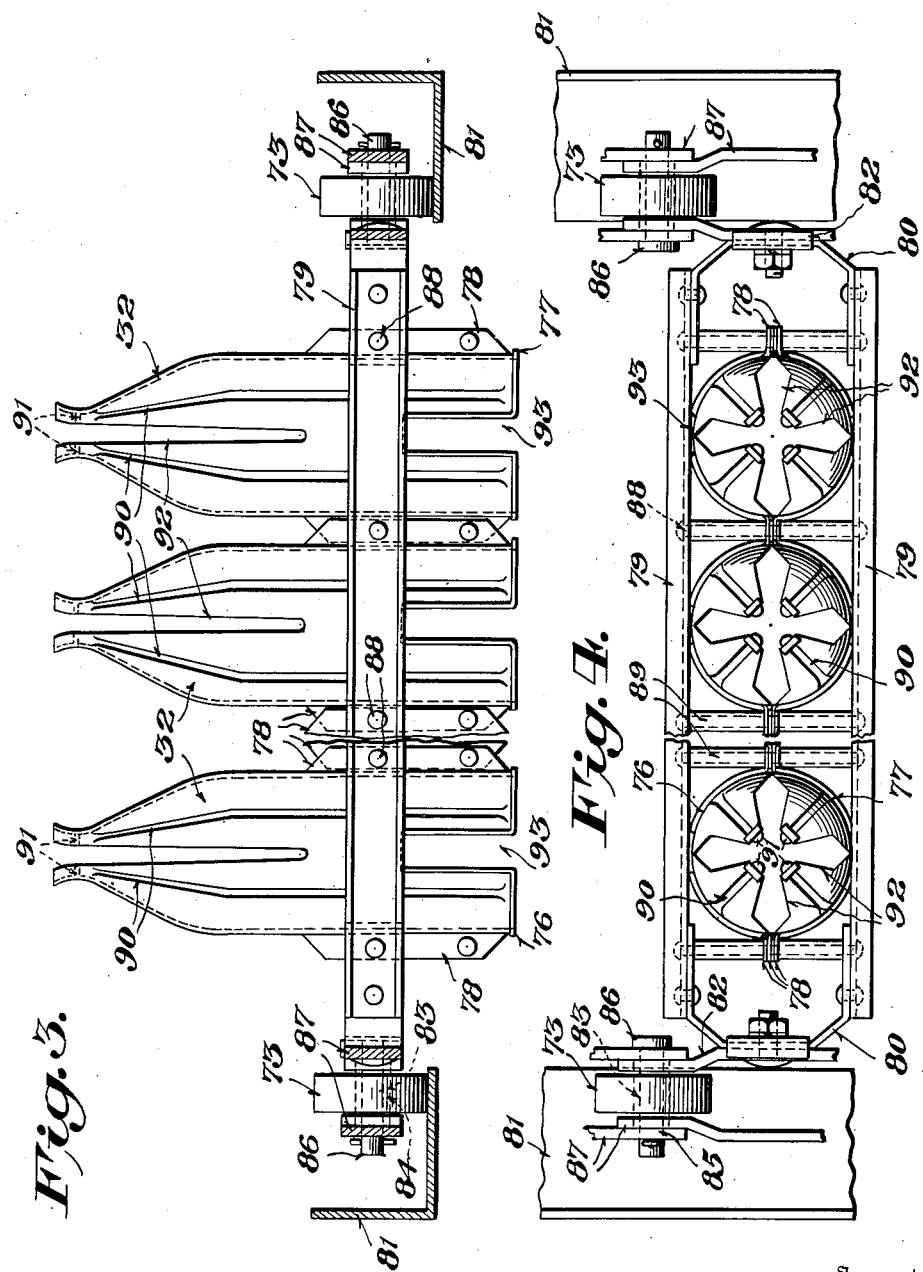

July 13, 1948. W. F. FISCHER 2,444,925
CONTAINER WASHING MACHINE
Filed July 25, 1940 13 Sheets-Sheet 7
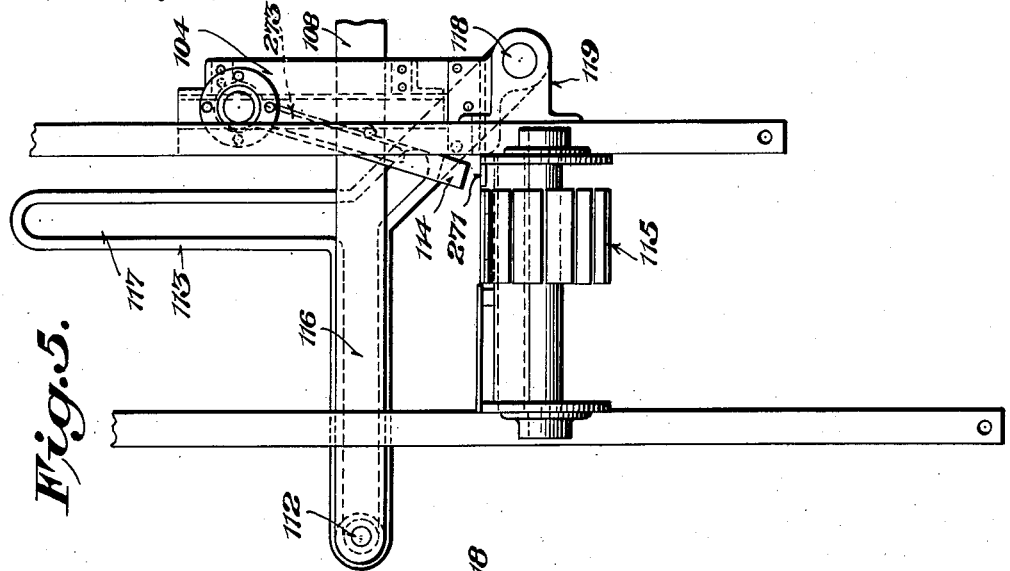
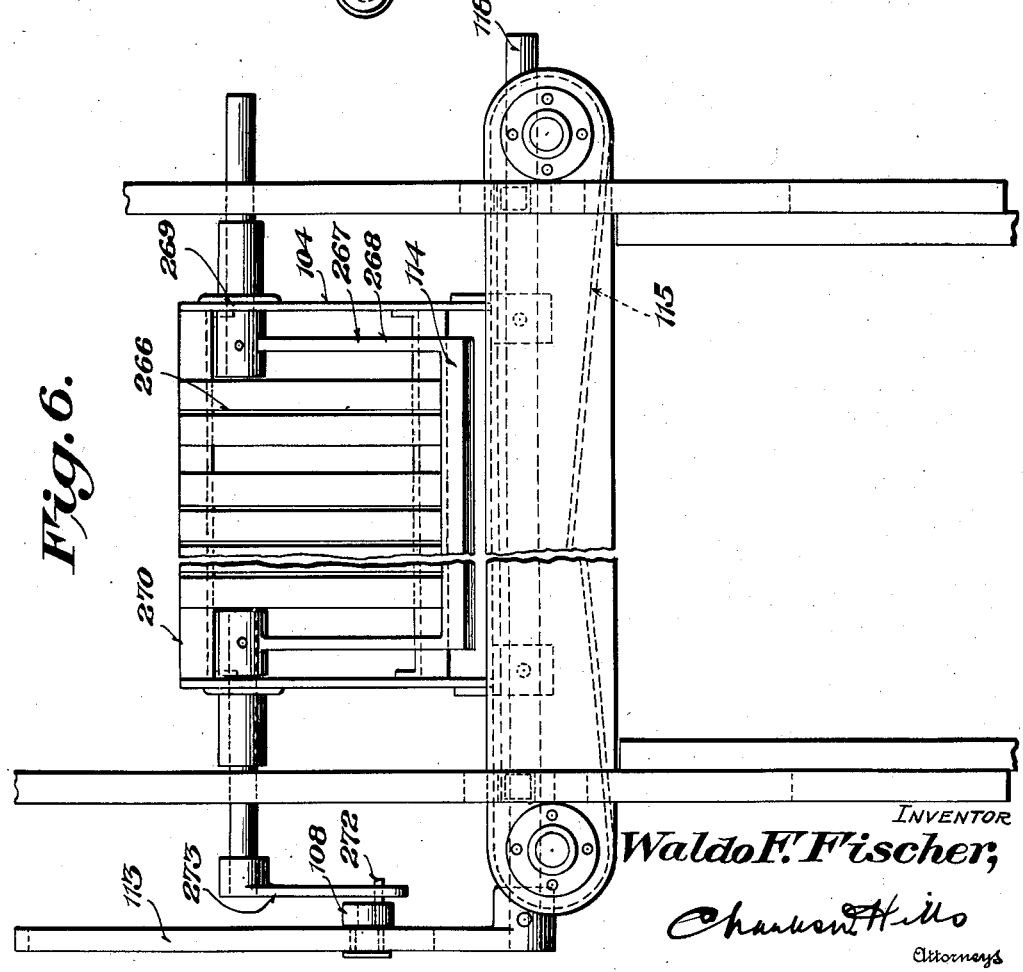
INVENTOR
Waldo F. Fischer
Charles Hills
Attorneys July 13, 1948.  W. F. FISCHER  2,444,925
CONTAINER WASHING MACHINE
Filed July 25, 1940  13 Sheets-Sheet 8
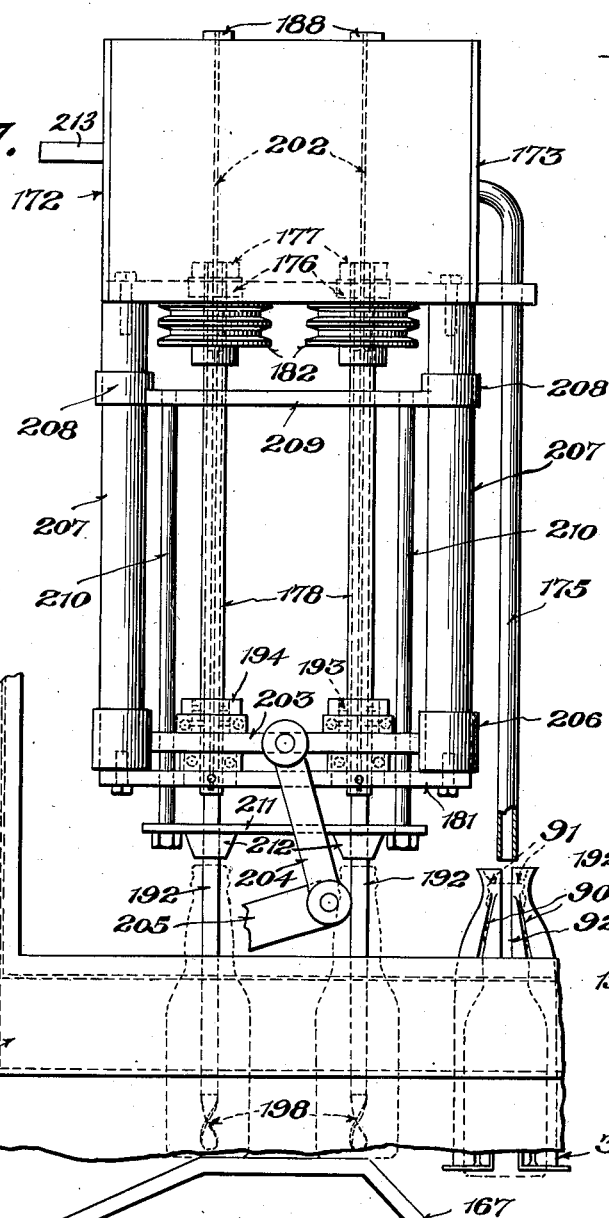
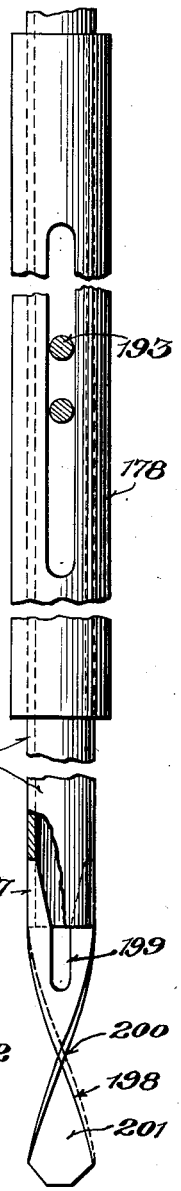
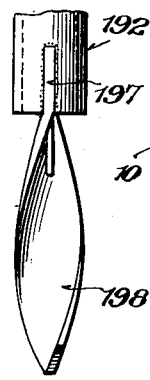
Fig. 7.
Fig. 8.
Fig. 9.
Fig. 10.
Inventor
Waldo F. Fischer,
By Charles W. Hills
Attorneys

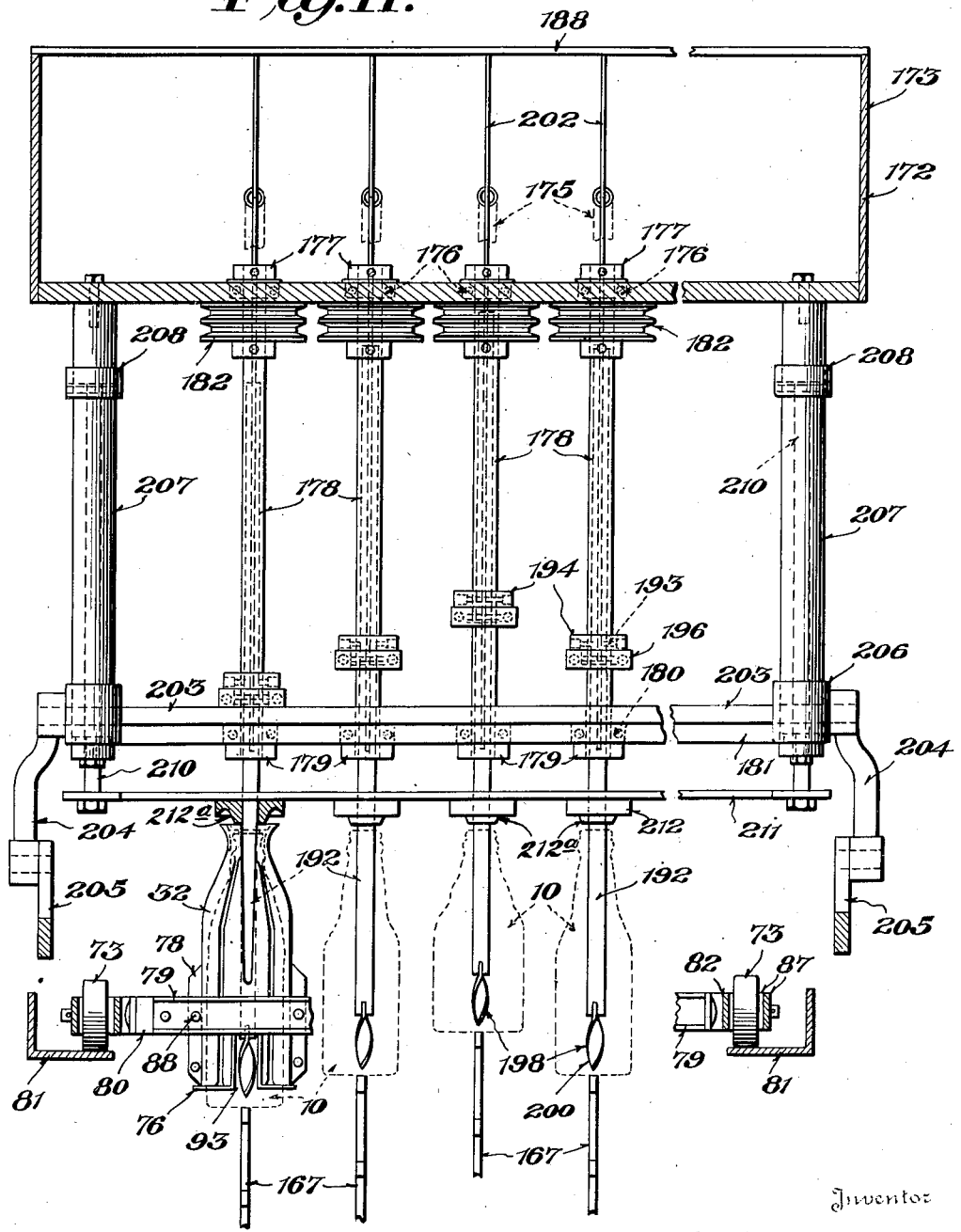

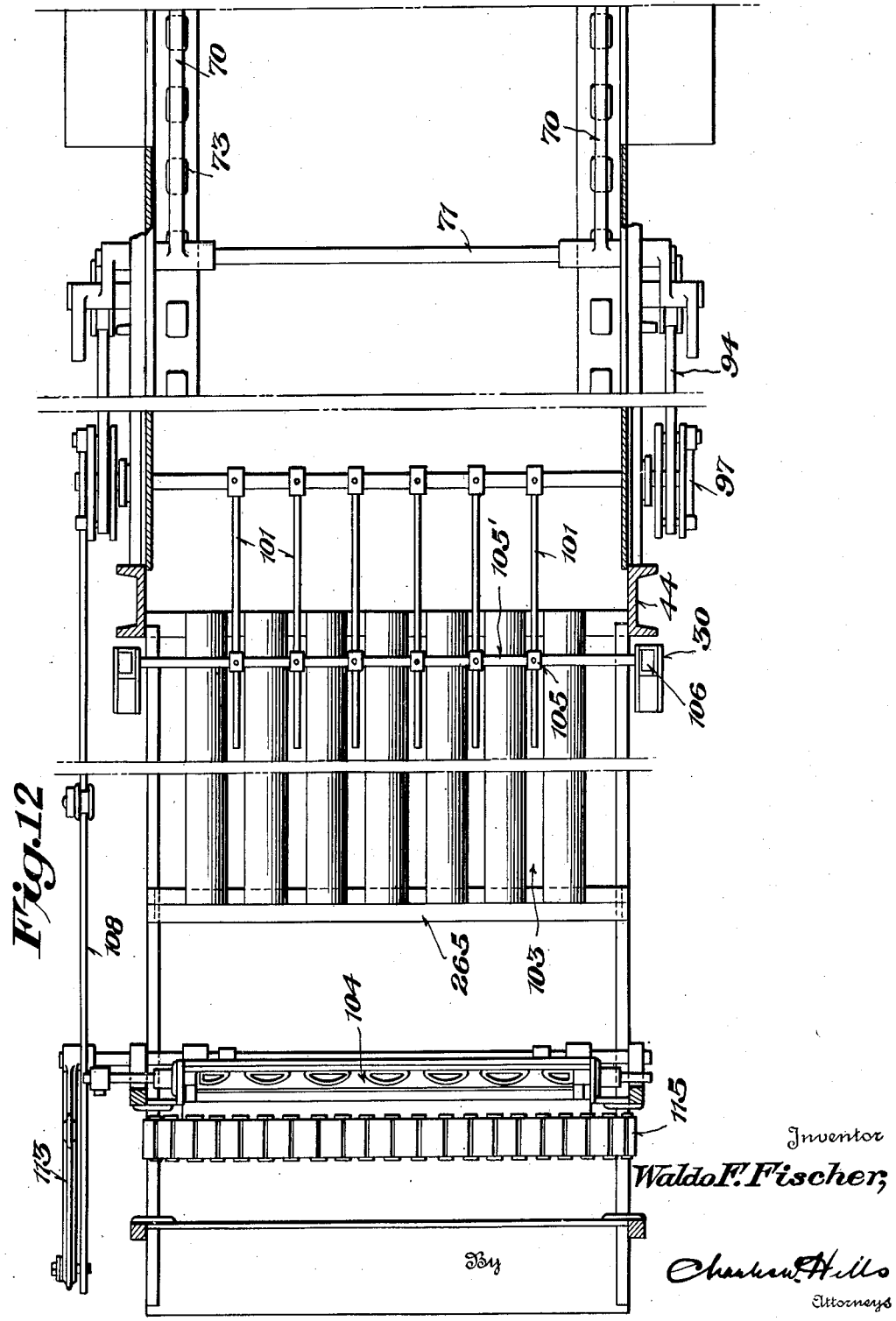

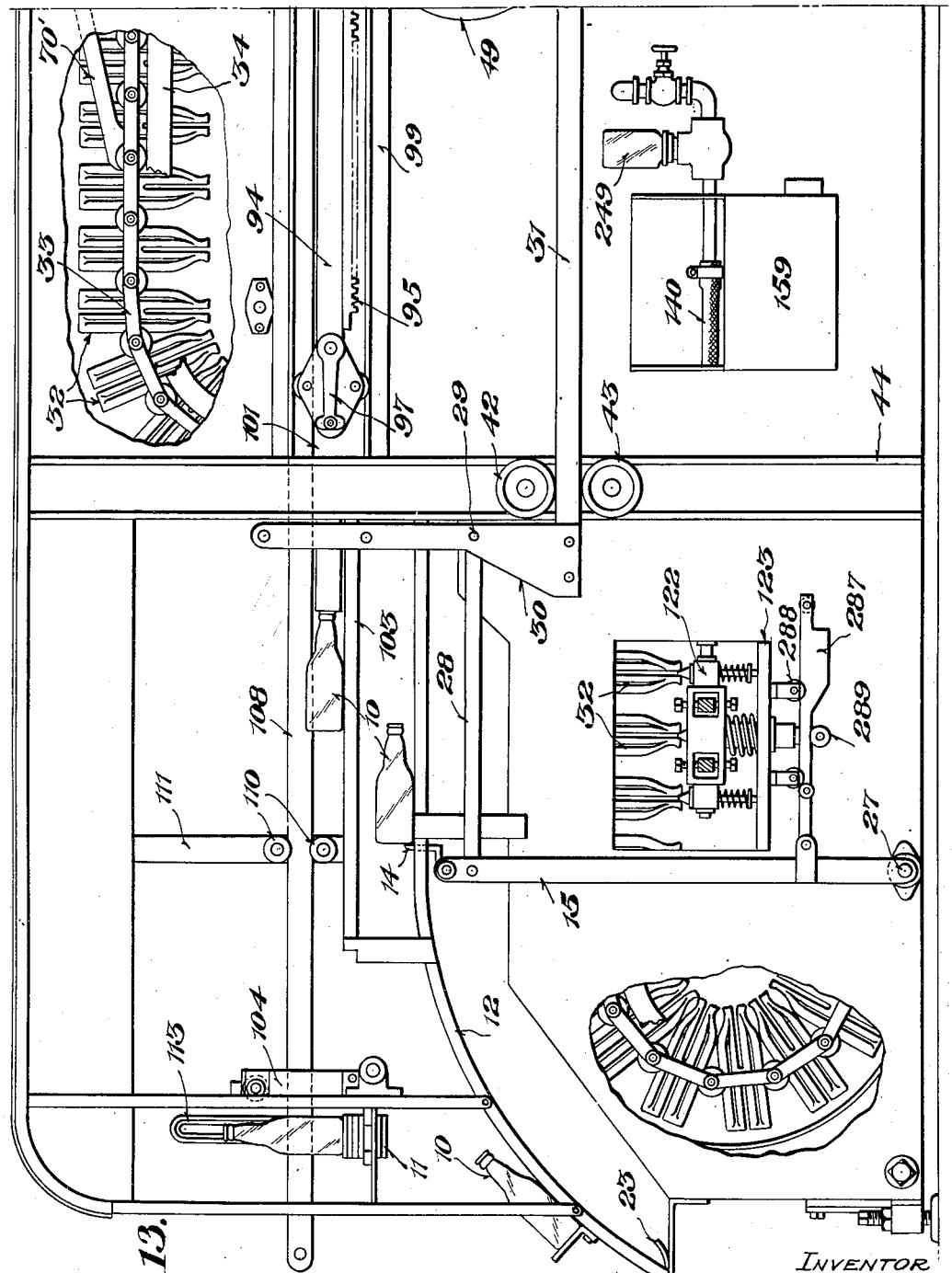

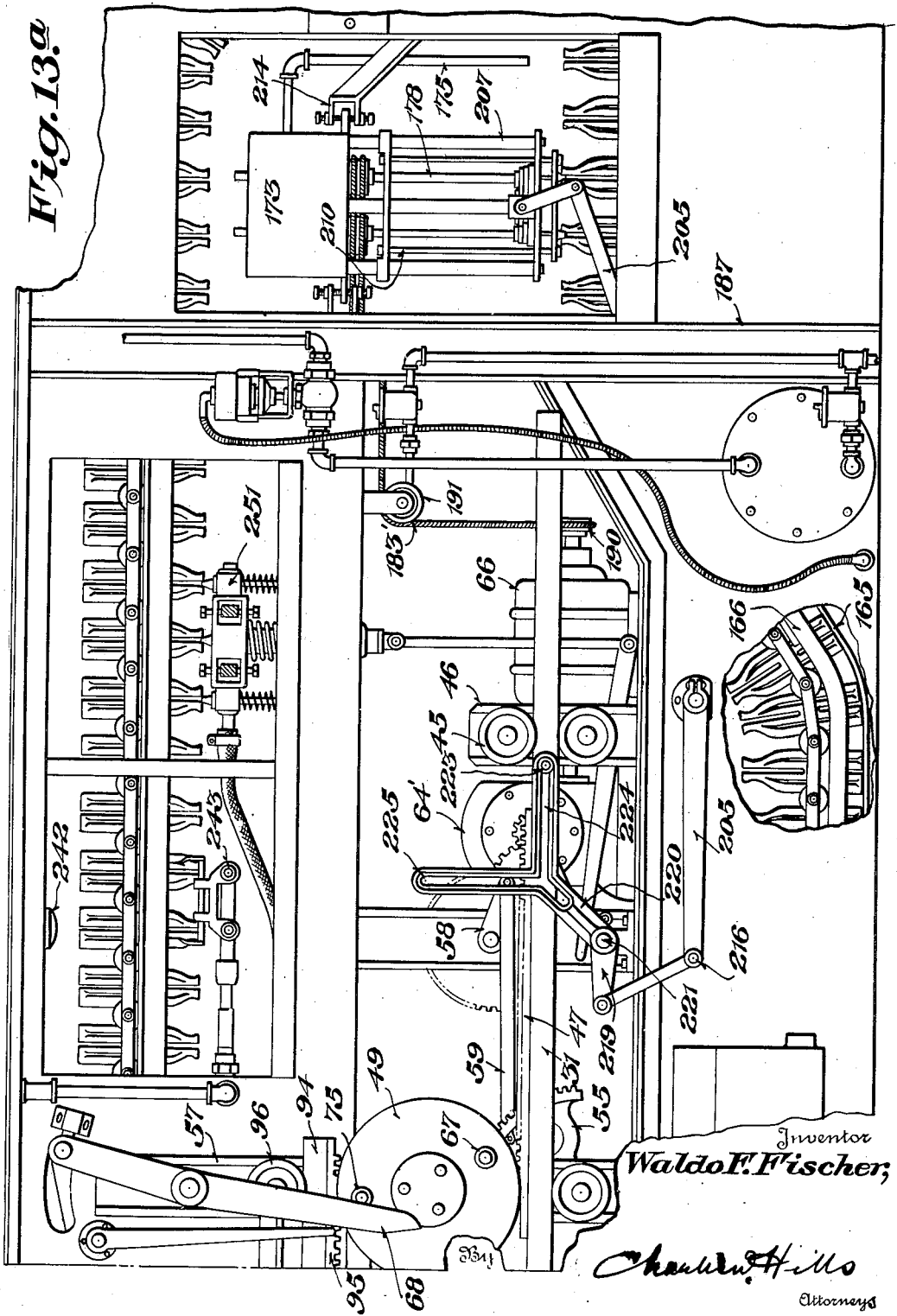

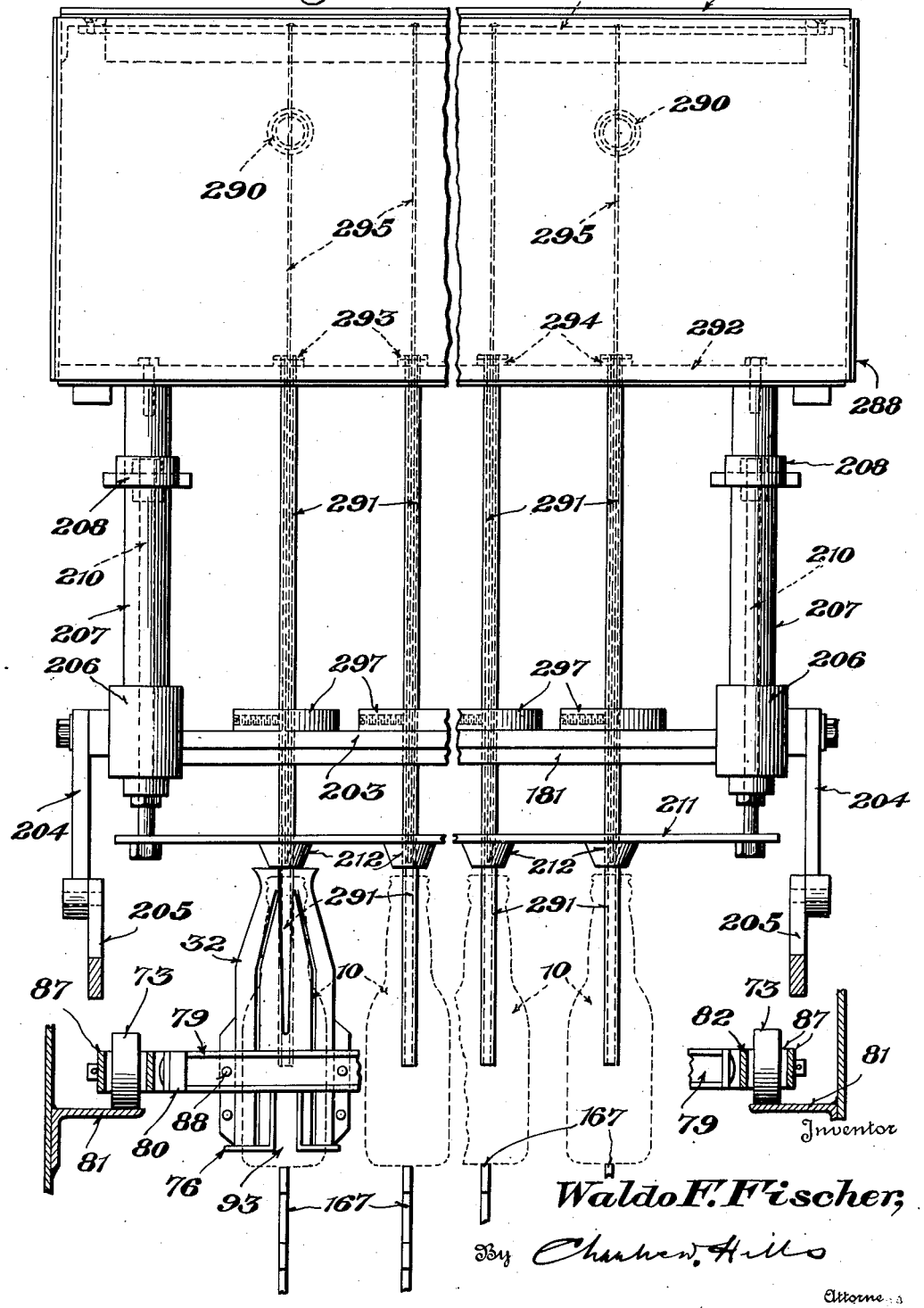

Patented July 13, 1948

2,444,925

UNITED STATES PATENT OFFICE 2,444,925

CONTAINER WASHING MACHINE

Waldo F. Fischer, Chattanooga, Tenn., assignor to Charles E. Kimball, Chattanooga, Tenn.

Application July 25, 1940, Serial No. 347,528

24 Claims. (Cl. 134—60)

The present invention is related to machines for sterilizing and washing containers such as empty milk bottles, soft drink bottles, cheese containers, and the like, to make certain of their being put in a completely sanitary condition and available then for carrying materials for human consumption.

It is an object of this invention to provide a novel container spraying device having means automatically operable in timed relation to control fluid flow through a spraying nozzle and to effect movement of a rod through the nozzle to remove foreign matter.

It is an object of this invention to provide a container washing machine having novel means to subject containers to a revolving spiral of caustic within the container and while the container is in upright position.

It is an object of this invention to provide novel means for washing containers while they are in upright position by whirling spirals of liquid disposed in the container.

It is an object of this invention to provide a novel basket for carrying containers in a container washing machine.

It is an object of this invention to provide in a container washing machine novel means to subject the exterior of a container to a stream of caustic and while the container is in upright position.

It is an object of this invention in a container washing machine to provide means to wash the interior and the exterior of a container with liquid containing soap in solution and to use the liquid as a caustic vapor trap and as a container heating medium as it passes on its way to a discharge outlet to a sewer.

It is an object of this invention to provide a container washing machine having novel means to eject a container from its basket in the machine.

It is an object of this invention to provide a container washing machine having instrumentalities moving in timed relation to subject a container to the following steps in timed sequence:

1. A soaking step in which the container is slowly moved immersed in a tank of hot caustic which extends for the greater part of the length of the machine;

2. The step of washing the container while in its upright position by a revolving and spiral stream of hot caustic revolving in one direction and within the container, and the washing of the exterior of the container by liquid ejected from the container;

3. The step of washing the container, as above, but with the stream revolving within the container in an opposite direction;

4. The step of washing the exterior of the container by a stream of hot caustic directed downwardly from above the container to remove labels.

Other and further objects and features of this invention will more fully appear from the following description, taken in conjunction with the accompanying drawings.

In the drawings:

Figures 1, 1a, 1b, and 1c, taken together, present a side elevation view of the container washing machine with parts cut away to expose other parts.

Figure 2 is a fragmentary illustration of a tripping mechanism with parts broken, parts in plan, and parts in section.

Figure 3 is a side elevation view of a container basket assembly, with parts broken and parts in section.

Figure 4 is a top plan view of the assembly of Figure 3.

Figure 5 is an enlarged side view in elevation of a container transfer mechanism shown in Figure 1; and Figure 6 is a front view of the same with parts broken.

Figure 7 is an enlarged side elevation view of the Spiralator device of Figure 1c, with parts broken and parts in section.

Figure 8 is an enlarged fragmentary view of a tube detail of Figure 7.

Figure 9 is an enlarged fragmentary view of a tube detail at right angles to the view in Figure 8.

Figure 10 is a bottom plan view of the tube of Figure 8; and

Figure 11 is an enlarged transverse section view of the Spiralator of Figure 7, with parts in elevation, and parts broken.

Figure 12 is a partial plan view of the front end of the machine of Figures 1 and 1a.

Figure 1B:
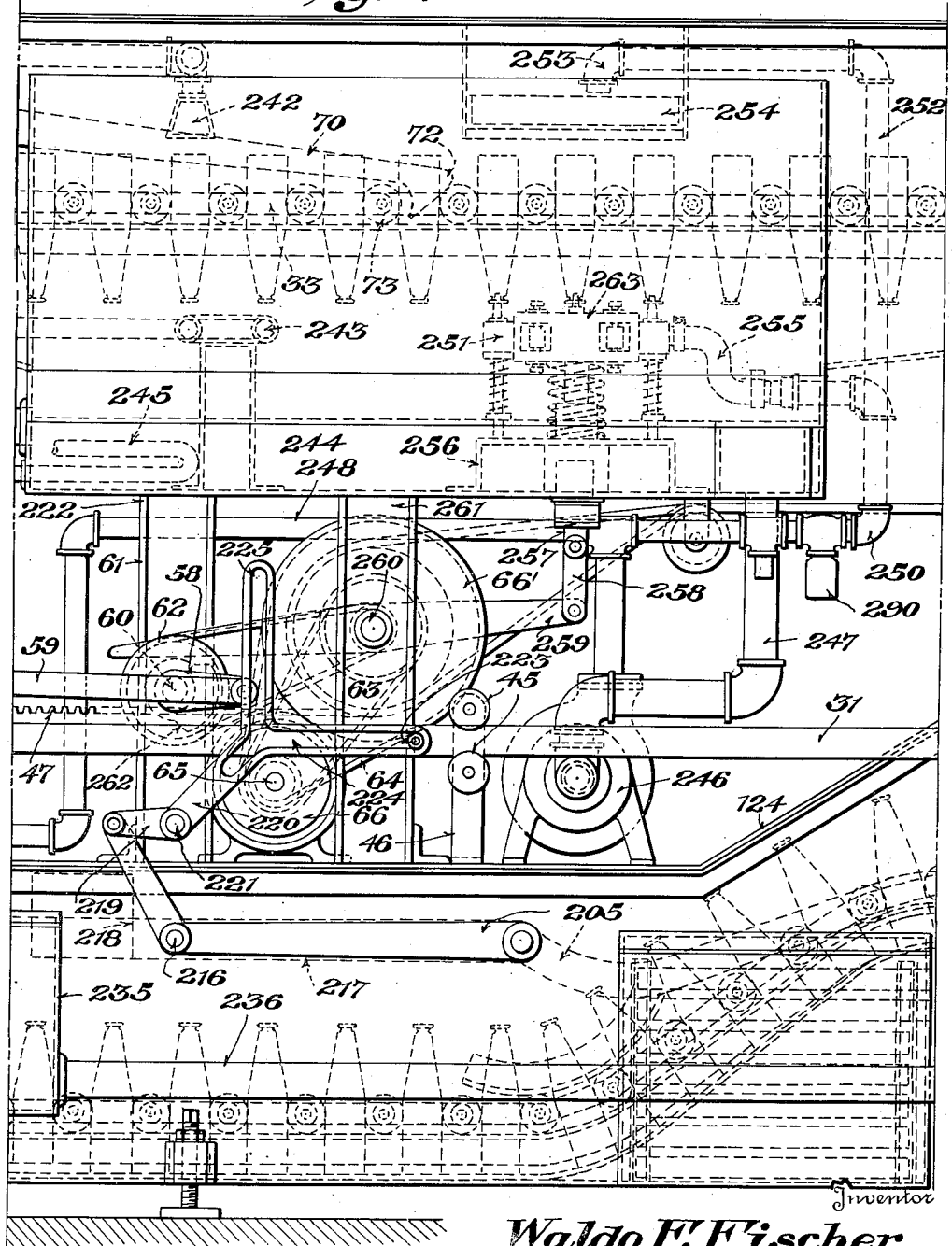

Figures 13 and 13a together show the machine of Figures 1, 1a, 1b, and 1c in side elevation, with parts broken away, and showing a modified arrangement of some of the parts.

Figure 14 is a diagrammatic showing of parts of the machine and associated electric circuits.

Figure 15 is a transverse view of a modified form of the device shown in Figure 11, with parts in elevation, parts broken, and parts in section.

In the machine described hereinafter, the milk or beverage bottle to be cleaned is pushed along a table to enter, neck first, a bottle holder or basket on a movable conveyor. Immediately after it is entered in the basket, the bottle is intermittently moved through a heated vapor zone to gradually raise its temperature and so temper or condition it in preparation for movement past jets of hot water to pre-rinse the interior of the bottle. After being pre-rinsed by hot water, the bottle is immediately moved into a tank of hot caustic, and is moved slowly through this tank for a relatively long soaking period. At the end of the soaking period the bottle is raised out of the tank, and, while sitting upright, it is washed internally by a revolving jet of hot caustic, and then subjected to streams of hot caustic directed over its exterior. After the treatment with hot caustic the bottle is inverted and allowed to drip. Then it is washed internally and externally by jets of hot water, and after this washing by hot water it is next washed by colder water, and then allowed to drip for a relatively long period. Finally, it is pushed from its basket on to a table, then turned to upright position, and then pushed on to a conveyor to be carried to a storage point for clean bottles.

The steps in the treatment of the container while it is in the machine may be divided up into 1. Tempering step,
2. The initial washing step in which a hot soap solution is used,
3. Soaking for a relatively long period in a hot caustic bath,
4. The step in which the bottle is washed by hot caustic issued in a spiral and revolving column in the bottle to compel the liquid in the bottle to be pumped out through the upstanding neck of the bottle and carry off solid matter,
5. The step of washing off labels on the bottle while the bottle is upright,
6. The steps of rinsing the bottle by hot water containing a sterilizing agent applied externally of and internally to the bottle while it is inverted,
7. The step of rinsing the bottle, the final rinse, by clear water, and
8. Movement of the bottle for a relatively long period to allow it to dry while in inverted position.

The temperatures of the treating mediums from the tempering step to the final rinse are adjusted to avoid breakage, and the tempering step is particularly advantageous in cold weather, when cold bottles are fed to the machine, and avoids breakage due to sudden changes in temperature.

While it is necessary for simplicity in illustrating and in describing the machine to deal with it, for the most part, as though it were handling a single row of bottles, it will be understood that the machine actually handles six or more parallel rows of bottles at the same time.

The bottles are entered in the machine at the left end, the front end, and are also ejected from the machine at that end.

Figures 1, 1a, 1b, and 1c, taken together, show the whole machine in side elevation, with part of the side plates of the machine nearest the observer removed to expose the conveyor in the tank.

Most of the driving mechanism is outside of the plates forming the sides of the machine and the cover of the tank, and some of the operating mechanism is in bays attached to the side of the machine.

In Figure 1, the numeral 10 indicates a container which initially appears at the left end of the container washing machine indicated generally by the numeral 11. The container is then resting on a slotted guideway 12 and with its bottom against an abutment 13. The container may be a milk bottle or a beverage bottle, or the like.

The guideway 12 is slotted so that a finger or dog 14, pivoted on the upper end of a lever 15, may get behind the bottle 10 and push it to the right into a guideway or chute 16 near the receiving end of the machine.

The lever 15 is shown in its final position, after having moved the bottle from left to right. The lever 15 is pivoted at its lower end in a bearing 27 mounted on the frame of the machine, and it is placed outside of the tank on the base of the machine. A similar lever is positioned on the opposite side of the tank, and a shaft extends between them to carry as many fingers 14 as there are rows of bottles to be fed to the machine. However, to simplify the description of the machine, it will be assumed that the machine is handling a single row of bottles, and it will be obvious that more than one row of bottles may be handled at the same time by simple duplication of parts of the bottle-moving elements.

The frame of the machine is made up of structural steel columns and bars, and of side and bottom plates defining the tank for hot caustic liquid. The tank extends along the length of the machine, and is thought of as being divided into a first, long tank through which the containers are moved while immersed in the caustic, and a second, short tank over which the containers pass and which receives caustic sprayed over the containers. The two tanks are in fluid communication with each other.

The finger 14 is carried on a fork 15a at the upper end of the lever 15 and on a shaft 17 revolvable in the fork and extending across the machine to a bearing in a similar lever 15. The shaft 17 carries a dog having arms 19 and 20, alternately engageable with a stop pin 21 on the lever 15.

A dog 18 on the shaft 17 has a finger 22 which is adapted to strike a striker 23 on the frame of the machine when the lever 15 has been moved to the left behind the container 10 to throw the finger 14 into the position shown in Figure 1, and with the arm 20 engaging the pin 21. As the lever 15 is leaving the position shown in Figure 1, another dog 24 on the shaft 17 has finger 25 moved into engagement with another striker 26 to throw the finger 14 to the horizontal position, and with the arm 19 now engaging the stop pin 21. Thus, the finger 14 is horizontal as the lever 15 moves to the left, and is vertical as the lever moves to the right to push the container 10 to the right. Suitable friction means are provided to encourage the finger 14 to stay in the position to which it has been thrown by the striker as the lever moves to the left.

The lever 15 is pivoted on the frame of the machine at 27, and is pushed and pulled by a reciprocable driving bar 28 pivotally connected at its left end to the lever, and pivotally connected at its right end at 29, Figure 1a, to an upstanding extension 30 on the left end of another reciprocable bar 31 which is reciprocated by mechanism described hereinafter.

As the bar 28 moves to the left, the upright extension or bar 30 of the bar 31 also moves to the left to engage behind a bottle already on the slide 16 and then when moved to the right push that bottle into a basket 32 carried by a conveyor 33 rolling along a runway 34, while the finger 14 brings up the next bottle to the guideway 16.

The extension bar 30 is provided with a dog 35 which is pivoted on a shaft 36 on the bar 30. The dog 35 has a finger 37 which engages a pin 38 on the bar 30 to limit downward movement of the finger. A member 39 hangs loosely pivoted on the shaft 36, and as the bar 30 moves to the left this member rides over the upper surface 40 of the chute 16 in inclined relation thereto, and the pin 38 on the member 39 engages the dog 35 and elevates it. At the end of the forward stroke of the bar 30, the member 39 drops over the end of the chute 16 and the dog 35 drops behind the rear of the bottle. On the return stroke of bar 30, the dog 35 rides through a slot in the chute 16, while the member 39 trails freely over the chute.

The bar 31 extending along the outside of the machine is guidedly supported at its left end between a pair of rollers 42 and 43 mounted on a bearing block secured to a column 44 of the machine frame. The right end of the bar 31 is also guidedly supported between a pair of rollers 45 (Figure 1b) mounted on an upright 46 of the machine. Intermediate its ends, the bar 31 is provided with a toothed rack 47 (Figure 1a) which meshes with the teeth 48 of a gear wheel 49 mounted on a shaft 50 in bearings carried by a vertical column 51 of the machine frame.

The shaft 50 also carries a smaller gear wheel 52 which has teeth 53 meshing with the teeth 54 of a sector 55 which is mounted on a shaft 56 carried in bearings 57 on the column 51.

The sector 55 is connected to a crank-arm 58 by a link 59 which is pivotally connected at its ends to the arm 58 and the sector 55. The arm 58 is connected to a shaft 60 (Figure 1b) carried in bearings on a short column 61 of the frame of the machine, and is driven by a pulley 62 on the shaft 60 and suitably connected by a belt 63, and a belt-gear system, indicated generally at 64, to the shaft 65 of a motor 66.

As is indicated in Figure 13a, the belt gearing may be replaced by reducing gears 64' in a suitable gear box.

The gear wheel 49 carries a roller 67 thereon, and as the wheel 49 rotates in a clockwise direction, this roller advances towards the left face of the lower end of a bent lever 68 which is pivoted at 69 on the column 51. A lever 70 is pivoted at 71 on the upper end of the lever 68, and it is provided at its right end with a hook 72 which is adapted to engage the rollers 73 of the conveyor 33.

The roller 67 on the wheel 49 obviously moves in a substantially vertical direction as it moves near the lower end 74 of the lever 68, and it first gently pushes the end 74 to cause the hook 72 to engage a roller 73. Subsequently, as the gear wheel continues to rotate, the horizontal component of the movement of the roller 67 appears, and the lever 68 is pushed to the right with a force that has an ever-increasing and sinusoidal horizontal component, so that the rollers 73 of the conveyor 33 are gradually accelerated. Thus, the slack is first taken up gently, and then the conveyor is accelerated without jerkiness. During this movement the pivot connection 71 rides to the opposite end of a limiting slot 71a.

When the conveyor 33 has advanced a desired distance, the sector 55 has reached the end of its stroke, and the roller 67 now retreats as the sector makes its return stroke. Later, another roller 75 on the wheel 49 moves in a counter-clockwise direction to engage the lower end of the lever 68 to move it to the left and cause the hook 72 to move idly to the right and to slide freely over the rollers 73.

In Figures 13 and 13a an alternative arrangement of the lever 68 and a lever 70' is shown, to push the conveyor rather than to pull it. In the alternative arrangement, as the disk 49 revolves counter-clockwise the roller 67 will engage the lower end of the lever 68 to push the member 70' to the left and so push the conveyor. Later, the roller 75 will engage the lever 68 to move the driving member 70' to the right and cause its hooked end to idle over the roller. Suitable means, not described, are provided to lift the member 70' in its trailing movement and drop it behind a trailing roller without noise.

Enough of the machine has been described to make it clear that as the motor 66 revolves continuously, the sector 55 will oscillate to cause reciprocation of the push bars 28 and 31, and the connected lever 15 and bar 30, and that the conveyor 33 is at rest while the bottle 10 is being pushed into the basket. It will also be clear that the conveyor is moving while the members 15 and 30 are on their way to engage a bottle, and that it moves just enough to bring a basket into position to receive a bottle.

The basket 32 is best shown in Figures 3 and 4. Each basket is formed of two similar curved parts 76 and 77, and each of these parts is provided with side wings 78. A carriage for the basket is formed of a pair of spaced opposed and transversely extending bars 79 which are connected at their ends by end yokes 80. The carriage is borne by rollers 73 which ride on a guideway indicated generally at 81. At each end of the carriage, longitudinally extending link-bars 82 are secured to the yokes 80, and are apertured at one end 84 to receive the bushing 83 of a roller 73, and at the other end 85 to receive a pin 86 which passes through the bushing of a roller and through the ends of adjacent connecting links of adjacent carriages. Disposed opposite the link-bars 82 are other link-bars 87 which are similar to the bars 82, so that the carriages are connected to each other by pairs of links at each end.

Pins 88 extend between and are secured to the pairs of bars 79 and pass through the overlapping side wings 78 of adjacent baskets, as shown in Figure 3, to carry the baskets. Spacers 89 on the pins 88 maintain the baskets in spaced relation to the bars 79.

As shown best in Figure 4, the assembled parts 76 and 77 of the basket define a tubular container adapted to receive a bottle having a narrow neck. Each of the parts 76 and 77 is provided with internal guiding ribs 90 formed by depressing the metal of the part, and each part is provided at its upper end with curved stop or bottle stopping members or bosses 91. The parts are also shaped to define four upper slots 92, so that a flat bar may be entered in the basket through the upper end thereof and through opposed slots to expel the bottle. A cruciform bar may also be used for the same purpose. The parts are also shaped to define a pair of opposed bottom slots 93 into which a blade may be entered to lift the bottle in the basket for a purpose to be described hereinafter. Because of the presence of the internal ribs 90 and of the mouth stop member 91, the basket accommodates itself to a wide range of bottle shapes. The internal ribs 90 hold the container in spaced relation to the internal face of the basket, so that, in effect, ducts are formed between the container and the basket face through which fluid may flow to scour the outside of the container. The basket may be formed of resilient metal so that the neck of the basket immediately below the stops 91 may yield somewhat in engagement with the lip on the mouth of a container. The basket is preferably formed of a bendable metal so that the basket may be readily shaped at its upper end by hand to enable a given basket size to be shaped to suit containers of several different proportions. The upper part of the basket, above the stops 91, forms a socket to receive a centering member for a purpose to be described later.

While the conveyor 33 is at rest to permit a bottle to be pushed into a basket by the dog 35, means are provided to then expel from a basket a bottle that has reached the delivery point immediately above the receiving point. The expelling means include a reciprocable bar 94 (Figure 1a) which has a toothed rack 95 engaging the teeth 48 of the gear wheel 49. The bar 94 is guided at its right end by a guiding roller 96 mounted on the column 51, and at its left end by a carriage 97 having rollers 98 cooperating with opposed runway members 99. The bar 94 is pivotally connected to the carriage 97 at 100. A blade 101 is adjustably connected to the carriage 97 by adjusting means indicated generally at 102, and this blade enters the slots 92 of the basket to eject the bottle therein on to a table 103. As the blade 101 moves to the right on its return stroke, and after having ejected the bottle, the member 30 now moves to the left to push the bottle on to a movable table or lift 104, which will be described more fully hereinafter. A dog 105 on a shaft 105' pivoted on the upper end of the member 30 has an arm 106 adapted to engage a stop pin 107 on the member 30, so that as the member 30 moves to the left the finger 105 will engage a bottle on the platform 103 and push it over the end of the platform on to the table 104, which is then lying in alignment with the platform, and is freely movable to trail over another bottle on the platform as the member 30 returns to the position shown in Figure 1.

A reciprocable bar 108 is pivoted at its right end to the carriage 97 at 109, to oscillate with the bar 94, and is guidedly supported intermediate its ends by rollers 110 mounted on a strap 111 depending from the frame of the machine.

The bar 108 carries a roller 112 at its left end which is slidable in a slotted star-shaped lever 113. As the bar 108 moves to the left, it tilts the table 104 from a horizontal position to the vertical position, and a pusher element 114 pivoted on the table pushes the bottle on to a conveyor 115, which carries the clean bottles away from the machine. As the bar 108 moves to the right, the roller 112 moves along the slotted arm 116 of the star-shaped lever to the center of the star, and then moves along the slotted arm 117 which has been tilted to the horizontal position by the advancing roller. The star lever 113 is secured to a shaft 118 carried by a bearing 119 suitably mounted on the machine, and the table 104 is secured to the same shaft, so that when the arm 117 is tilted to the horizontal position, the table 104 is also tilted to the horizontal position to form an extension of the table 103.

After the dirty bottle has been placed in the basket, it is moved downwardly by the conveyor and gradually inverted as the conveyor travels over a curved guideway 120, and assumes a completely inverted position as the conveyor travels along a horizontal guideway 121. The dirty bottle presently comes to the pre-rinsing station and over a rinsing apparatus indicated generally by the numeral 122, where it is washed by hot water carrying soap in solution. In its passage from the receiving point to the pre-rinsing point, it has been subjected to warm vapor from the pre-rinsing apparatus and has been tempered, so that it will not crack when exposed to the hot water. The foreign matter on the bottle has also been exposed to the warm vapor to encourage its becoming somewhat loosened.

The pre-rinsing device 122 extends transversely of the machine and into bays 123 on the sides of the machine so that the mechanism for reciprocating the device may be conveniently located in the bays for oiling and inspection. It is disposed above a cover 124 of the tank containing the hot caustic solution. This device 122 includes a casing 125 containing rinsing nozzles. Means are provided for pulling the casing 125 downward at definite times in relation to movement of the conveyor, and such means include a bell-crank 140 which is pivoted at 141 on the column 44 on the outside of the machine. The upper arm 142 of the bell crank carries a roller 143 which is adapted to be engaged by a depressing bar 144 (Figure 1a) on the bar 31 to lower the lower arm 145 of the bell crank for the automatic lowering of the casing 125 to permit bottles to pass the nozzles as the conveyor advances the bottles one step ahead.

The lower arm 145 is povotally connected at its free end to a link 146 which is pivotally connected at 147 to a round drawbar 148 connected with the casing 125.

In Figure 13 a somewhat simplified operating means for the device 122 is shown. A cam 287 is pivotally connected to the lever 15 and is guided on its upper edge by rollers 288 on the frame of the machine. The lower edge of the cam 287 rides on a roller 289 attached to the reciprocable bar 148 to pull it downward against the spring 154 as the lever 15 moves to the left, and the drawbar 148 obviously rises as the lever 15 is moved to the right.

The containers are rinsed three times on their way past the spraying device 122, and it is found in practice that pre-rinsing bottles with the hot soapy solution results in bottles with a clean, sparkling appearance as they leave the machine.

The dirty water that falls from the bottles drops on to the tank cover 124 and along a slanted portion of the cover into a catch basin 159 in a bay on the side of the machine, and out through a pipe 160 to the sewer.

The cover 124 extends along the machine to keep the vapor of the hot caustic in the tank from rising through the mechanism above the caustic.

The hot caustic is carried in a tank, indicated generally at 161, and which is formed by the bottom plates and side and end plates of the machine.

It is important to note that the cover 124 terminates at its left end in an upstanding and inclined baffle 162 which deflects vapor from the hot caustic to cause it to be trapped by the hot water spray from the nozzles 127 and sent to the sewer. Adjacent the baffle 162 a pipe 163 discharges water from another rinsing position, and this water will also pick up some of the caustic vapor as it discharges on to the cover 124.

At the right end of the tank the cover 124 extends up the left face of a column 185 and an opening is provided near the upper end of the column for the containers to pass through.

As the bottles leave the pre-rinsing position, the conveyor passes along a curved guideway 164 and the bottles gradually assume an upright position, with their bottoms being supported by transversely spaced guide rails 165 which are curved at the left end of the machine, and which extend along the bottom of the machine. While the bottles are upright the conveyor travels on a guideway 166 spaced above the guides 165. The bottles enter the hot caustic as they reach the upright position, and they are within the caustic for a relatively long time, to soak off the foreign matter.

As shown in Figures 1b and 1c, as the bottles near the right end of the machine, the conveyor guideway 166 and the bottle guides 165 curve upwardly to rise to another position at which the bottles are again sprayed, but in this spraying it is hot caustic that is the cleansing medium.

In Figure 1c the guides 165 and 166 are horizontal, and the bottle is shown temporarily at rest and lifted above the guide rails 165 by a cam plate 167, which enters the lower slot 93 of the basket 32 as the basket is advanced towards it. They are also over a second tank 186 separated from the main tank 161 by a partition 187 having a portion suitably perforated to provide a screened overflow connection with the main tank. There are no moving mechanisms in the second tank, and the liquid is relatively quiet to encourage the settling of foreign matter dropping into it.

The plate 167 is pivoted on one end of a lever 168 which is pivoted at 169 on a suitable support on the frame of the machine, and the other end of the lever is counterweighted by a counterweight 170. The plate 167 is yieldingly restrained in its pivotal movement by a coiled spring 171 connected to the right end of the plate and to the lever 168.

In its elevated and upright position in Figure 1c, the bottle is now below what is generically termed a Spiralator, and the device is indicated generally by the numeral 172. While at the Spiralator position the bottle is first washed by an internal whirling and spiral jet revolving in one direction, next washed by a similar jet revolving in an opposite direction, and then has its outer vertical surface washed by a stream to remove labels and other foreign matter. The internal jet is designed to scour the inner surface of the bottle and to expel the foreign matter in the bottles, which often includes paper caps, pieces of drinking straws, and pieces of paper.

The Spiralator assembly 172 comprises a tank 173 into which hot caustic drops from a pipe 174. Overflow pipes 175 extend from apertures in the side wall of the tank and extend downwardly to a point adjacent bottles standing upright in baskets positioned below the lower end of the tubes to wash off labels and other foreign matter adhering to the outer surface of the bottles. The pipes have a bore of about three-quarters of an inch, and the stream of hot caustic hits the mouth of the already full bottle and passes down the channel defined between the side of the bottle and the inner face of the basket to form turbulent sheets of caustic. As will appear later, the caustic from the pipe 174 runs out through the bottom of the tank through revolving tubes, and means are provided to lift the upper ends of the revolving tubes above the overflow outlets, so that the caustic is then automatically diverted to the overflow pipes 175.

The bottom of the tank is provided with apertures in which ball bearing housings 176 are placed with a press fit, and carried by a collar 177 riding on the bearings is an outer or first tube 178 which extends downwardly through the bearings. On the lower end of the tube 178 is a collar 179 secured thereto, and this collar rides on ball bearings 180 pressed into apertures in a spacer bar 181. A plurality of tubes 178 is provided, and each tube is provided with a grooved pulley 182 secured thereon and connected by an endless belt 183 to the main driving pulley 184 which is mounted on a shaft carried in bearings on a vertical column 185 of the machine. The shaft also carries a pulley connected by belting driven by a pulley suitably connected with the pulley of a motor 66. A somewhat simpler driving arrangement is shown in Figure 13a, in which a belt 183' is driven by a pulley 190 on the end of the motor shaft and guided over a sheave 191. The belts 183 and 183' are disposed about the pulleys on the tubes so that certain tubes rotate in one direction and certain others rotate in an opposite direction.

A second tube 192 is placed to reciprocate within the first tube and to rotate therewith. The first tube 178 is provided with an elongated slot, and shouldered pins 193 extend through the slot from a collar 194, slidable on the first tube, to enter side apertures in the second tube 192, so that the second tube is driven with the first tube. The collar 194 is connected with a ball bearing assembly 196 which carries the collar in guided relation to the outer surface of the first tube 178.

The lower end of the inner tube is slotted at 197, and a bar 198 having a slot 199 at its upper end is entered in the lower end of the tube and is secured thereto. The bar 198 is given a half-turn twist along its length, as indicated at 200, to define a vane 201, and the lower end of the bar is cut to define edge surfaces at an angle of forty-five degrees to the transverse axis of the bar. The lower end of the bar is ground smooth. A bar 188 extends across the top of the tank and carries needles 202 which extend downwardly within the inner tube 192, and they are adapted to extend into the fork 199 of the bar 198 to expel foreign matter when the tube is raised out of the bottle. The vane bar 198 may be of such a length that it rests on the bottom of the bottle when the inner tube is lowered, and if the bottles are of different lengths, the collars 194 will appear at different heights along the outer tube. In Figure 11 the vanes are shown in bottles of different lengths, to show that the arrangement automatically accommodates itself to the washing of bottles of different lengths.

When the vane is in the bottle, it tends to stir up and tear up caps of milks bottles, straws, and paper which are often found in empty bottles.

The outer tubes 178 pass through apertures in a lifting bar 203 of a lifting frame, and this bar is elevated by links 204 which are pivotally connected to the bar at one end and to a lever 205 at the other end. The bar 203 has tubular end portions 206 which are slidable along guide rods 207 which depend from and are secured to the bottom of the tank 173. The lower ends of the guide rods are connected by the spacer bar 181. As the lifting bar is raised, it engages the roller bearings 196 and raises the inner tubes and their vanes clear of the tops of the baskets. When the inner tubes are in their elevated position, their upper ends are above the overflow outlets to the pipes 175 and above the level of the liquid in the tank, so that flow of caustic through them automatically ceases. The clearance between the inner and outer tubes is slight, so that there is substantially no leakage of fluid.

The tubular end portions 206 of the lifting frame engage other tubular end portions 208 of a second lifting bar 209 which carries rods 210 secured at their lower ends to a centering frame made up of a plurality of connected bars 211. The bars 211 carry apertured bosses 212. The bosses engage the flared mouth of the basket and are guided by the fingers of the basket, so that all of the apertures are in line with the mouths of the bottles to guide the inner tubes 192 passing through the apertures into the bottles. The bosses may be shaped as at 212a (Figure 11) to provide means to deflect caustic issuing from the mouth of the bottle down over the outside of the bottle, if fluid pressure conditions are such as to cause the fluid to issue as a jet from the mouth of the bottle.

It will now be evident that when the bar 203 is in its elevated position, it has lifted the bar 209 and the centering bar 211 clear of the tops of the baskets, and that as the lifting bar 203 is being lowered the centering bar first engages the baskets and then the vanes 198 subsequently enter the bottles. As the bar 203 continues in its descent, it will become disengaged from the roller bearings 196 connected with the inner tubes 192, when the vanes have to descend but a short distance to rest on the bottom of a short container. As the inner tubes descend, their upper ends fall below the level of the caustic in the tank, and caustic now flows through them.

The tank 173 carries wings 213 which are adjustably mounted on brackets 214 fastened to a column 185 and to a support 215 respectively, so that the Spiralator may be removed as a unit through the side of the machine for repairs or for adjusting.

The hot caustic solution is pumped from the main tank 161 through a suitable screen 233, and along a pipe 236 by a low pressure pump 237, and is raised through a pipe 238 to fall into the tank. The caustic falling from the Spiralator station enters the second tank 186, and paper and other foreign matter washed from the bottles drops to the bottom of this tank, and relatively clear liquid flows over a weir 187 into the main tank 161. The liquid in the main tank is kept hot by steam coils.

When the bottles reach the Spiralator position, they are already filled with hot caustic. At the Spiralator station they are subjected to a revolving and spiral jet of hot caustic issuing from the lower end of the inner tube 192 and flowing along the vane 198 to scour the inside of the bottle and to put solid matter into suspension for flowing out through the mouth of the bottle. Since it is possible that tiny flakes adhering to the side of the bottle may be bent or deflected in one direction and not torn from the side of the bottle, the bottle is next subjected to a revolving jet revolving in an opposite direction to tear the flakes away from the side of the bottle, or in other words, the side of the bottle is swept in two directions just as one often finds it necessary to sweep a floor in more than one direction to remove lint.

The bent lever 205 is connected intermediate its ends to a shaft 216, mounted in bearings on the frame of the machine, and a lever 217 also connected to the shaft carries a counterweight 218. The left end of the lever 205 is connected by a link 219 to a slotted cam 220 which is pivoted at 221 on a shaft on a short column 222 of the frame of the machine. The drawbar 31 carries a roller 223 which slides in the slots 224 and 225, respectively, of the cam 220, and causes the cam to tilt as it reciprocates.

After the bottles have been washed by the spiral jets and by the stream from the overflow pipe 175, the conveyor leaves the horizontal portion 166 of the conveyor guide, and then travels along an upper and curved guideway 226 as the bottles ascend to the top of the machine. At the end of the vertical travel of the bottles the conveyor now rides on upper horizontal guideway 227, and the bottles are now inverted.

Means are provided at the right end of the machine to take up slack in the conveyor, and comprise a curved guideway section 228 which is hinged at its lower end at 229 to the section 226, and which is adjustably held at its upper end by a tensioning bolt 230 passed through an upright 231 of the frame of the machine. The adjustable section 228 carries a threaded bolt 232 which rides in a curved slot 233 of a plate 234, secured to the frame of the machine, so that nuts on the end of the bolt may be tightened against the plate to hold the section locked in its adjusted position.

As the bottles move to the left on the upper portion of the machine and pass over and beyond the Spiralator, they pass through an opening 239 in the upwardly extended portion 240 of the tank cover 124 to a point at which they are sprayed, inside and out, with hot water which may carry a suitable sterilizing compound in solution. Caustic vapors arising from the Spiralator station and passing through the opening 239 are trapped by the spray at the spraying point. Water from the city supply system is carried by a pipe 241 to discharge through outlets 242 and 243, placed above and below the containers, respectively, to give them a final rinse, and this water drops into a tank 244 as make-up water. The overflow from this tank is carried by the pipe 163 which discharges adjacent the baffle 162 at the left end of the machine. A steam coil 245 heats the water in the tank.

A motor driven pump 246 draws water from the bottom of the tank through a pipe 247 and pumps it into a header 248. The pipe 140, already mentioned, is connected to this header, and hot water on its way to the pre-rinsing device passes through a soap container 249 to insure a supply of soap in solution.

Another pipe 250 is connected to the header 248, and through a flexible hose 255 to a spraying device 251 similar to that of the pre-rinse device 125, already described. The hot water in the pipe 250 passes through a container 290 containing a suitable sterilizing chemical. A pipe 252 connected to a low pressure pump, not shown, delivers hot water through an outlet 253 and a tray 254 of wire screen to drop on the bottles from above.

The spraying device 251 is mounted on a supporting frame 256 seated on the bottom of the tank, and it is provided with a drawbar 257 connected by a link 258 to a lever 259. The lever 259 is pivoted at 260 on a shaft which also carries the belt and pulley gears indicated at 66, and the shaft is carried by a short column 261 disposed between the tank 244 and a base frame 124 forming a part of the cover for the tank 161. The left end of the lever 259 rides on a crank 262 carried by the pulley 62, and as the pulley revolves the lever 259 is oscillated by the crank to reciprocate the drawbar and the spraying head 263 connected thereto.

It is important to note that the several means for rinsing the bottles with clear water after their trip through the caustic are placed relatively near the right end of the machine. It will be evident that in the relatively long trip from the final rinsing position to the point at which the bottle is opposite the ejecting blade 101, the bottles are given ample time in which to drip. A drip tray 264 catches the drips from the bottles and returns the water thus gathered to the tank 244.

When the dry bottle reaches a position opposite the ejecting blade 101, the bottle is ejected from its basket, and the basket now becomes available to receive a dirty bottle when the lever 70 moves the conveyor one more step.

The steps in which the bottle is ejected from its basket and pushed along the platform 103 and on to the movable table 104 have been described hereinbefore. The means for bringing about movement of the table 104 have also been described.

As the bar 108 moves to the right, the roller 112 thereon rides in the slots 116 and 117 of the star lever 113 to tilt the lever and turn the shaft 118 to bring the table 104 to a horizontal position and resting on an abutment 265 at the end of the platform 103. The table 104 carries a plurality of outstanding side members 266 defining trays for the bottles, and it is into these trays that the bottles are pushed by the dog 105. When the table 104 is lying horizontally and in alignment with the platform 103, a bottle ejecting or pushing frame 267 having end arms 268 pivoted at one end at 269 on the table 104 is lying with its cross-bar 270, which connects the other ends of the arms 268, disposed behind bottles lying in the tray. The pivot point 269 of the frame 267 is disposed so that the crossbar lies behind the bottles as the table 104 is assuming the vertical position, and until the frame 267 is swung by means to be described presently.

When the bar 108 again moves to the left, its roller 112 riding in the slots of the star lever 113 causes the star lever to tilt, thus turning the shaft 118, and turning the table 104 to the vertical position. As the table 104 assumes a vertical position, the bottles slide in the trays formed on the table to rest on a ledge 271 paralleling the run of the conveyor 115. As the bottles reach their vertical position, a pin 272 on the bar 108 strikes a short arm 273 secured to the frame 267 and causes the frame to tilt and the crossbar 270 to push the bottles on to the conveyor 115.

As shown diagrammatically in Figure 19, a pressure-responsive device 274 is connected in the header 248 to actuate a switch to connect a battery 275 to either wires 276 or 277 to energize the operating solenoids 278 or 279, to open or close, respectively, a valve 280 in the water supply line 241 and a valve 281 in the steam supply line 282 connected to the steam coil 245.

Should the pump 246 be stopped, there is then, unless the make-up water and steam supplies are seasonably interrupted, the possibility of the water in the tank 244 becoming unduly hot, and should the pump be started, as when the machine is being put into operation in the morning, without the steam being turned on within a reasonable time, the water in the tank will be too cold. Forgetfulness on the part of the operator may result in the breaking of bottles by a cold stream on the bottles following the hot caustic treatment, and by a cold final rinse following a hot rinse treatment, and the pressure-responsive means of Figure 14 have been provided to avoid the consequences of such forgetfulness.

It is also desirable that the supply of steam and water to the tank 244 be suitably proportioned for known operating conditions as to steam pressure and water pressure, to avoid tank conditions similar to those just mentioned, and means have been provided to simultaneously control steam and water flow to the tank. These means comprise valves 283 and 284 in the water and steam lines, respectively, and connected by gearing 285 for joint operation by a handwheel 286.

When the machine is used for washing beverage bottles such as are used in the soft-drink trade, the Spiralator unit heretofore indicated generally by the numeral 172 may be modified as shown in Figure 15, in which modification the caustic tank is closed and is supplied with caustic so that at all times there is sufficient pressure head to cause the liquid to surge through the tubes depending therefrom and into the containers to actively scour the containers. The means for elevating the containers under the device, and the means for elevating the caustic tubes, are similar to those described in connection with Figures 7 and 11, and similar numerals are employed to designate similar parts.

In Figure 15 the modified device is indicated generally by the numeral 287, and it comprises a closed tank 288 provided with a cover 289, and provided with caustic inlet conduits 290 for connection to a pump having a capacity exceeding that of a plurality of discharge tubes 291 which are arranged slidable through the bottom 292 of the tank.

The tubes 291 are provided at their upper ends with collars or flanges 293 which are seatable on rubber gaskets 294 secured on the bottom of the tank. A plurality of cleaning needles 295 are suitably secured to a support 296 secured to the tank at the upper end thereof, and these needles are entered in the tubes 291 so that when the tubes 291 are raised in the tank they will push out solid matter in the tubes.

The tubes 291 are each provided with a collar 297 adjustably secured thereto to weight the tubes and insure their falling by gravity for the flanges 293 to engage the gaskets 294, and the collar 297 is also adapted to be engaged by the lifting bar 203, already described.

The tubes 291 are lifted to clear the tops of the containers in step with movement of the other mechanism of the machine as described in connection with the device 172, and are lowered into the containers at the proper moment, as also described hereinbefore. The bars 211 and the bosses 212 are also reciprocated in synchronism with the desired movement of the tubes 291 and with movement of the containers 10. The containers are advanced in their baskets as the carrier moves forward, step by step, as described in connection with the device 172, and their outer surfaces are exposed to the stream of caustic from the tubes in their elevated position as the carrier advances the container from one tube to the other under the battery of tubes.

The device 287 is supported as a unit in the washing machine by suitable means (not shown) when used instead of the unit 172, and in the operative position occupied by the unit 172.

I claim as my invention:

1. A container washing machine comprising a container basket comprising an elongated tubular casing open at its top and bottom ends, said casing having a pair of spaced opposed side slots at the bottom end thereof, a runway, a ramp extending through said runway, and means to move said basket along said runway to cause said ramp to enter said slots and elevate a container disposed in said casing.

2. A container washing machine comprising a container basket comprising a casing open at its top and bottom ends, respectively, said casing being provided with spaced opposed slots in the wall thereof and at its bottom end, a yieldably mounted ramp, and means to move said basket to effect entry of said ramp in said slots to elevate a container disposed in said casing.

3. A container washing machine comprising a container basket comprising an elongated tubular casing open at its top and bottom ends, respectively, said casing being provided with a pair of spaced opposed slots in the wall thereof and at the bottom end thereof, a ramp, means to move said basket to effect entry of said ramp in said slots to elevate a container disposed in said casing, said casing being provided with a plurality of peripherally spaced fingers at its upper end to define a flaring mouth for said casing, a tube reciprocable in said casing, and aligning means movable relative to said tube to engage said fingers for guided movement thereby in the mouth of said casing.

4. A container washing machine comprising a runway, a carriage movable on said runway, a basket on said carriage to contain a container, said basket being provided with slots in a wall thereof and being upright to hold a container therein in its normal upright position, a ramp disposed below said carriage and having an inclined surface, means to advance said carriage towards said ramp whereby the container advances along said inclined surface and whereby said ramp enters said slots to elevate the container in said basket.

5. A container washing machine comprising a runway, a carriage movable on said runway, a basket on said carriage, said basket being provided with slots in a wall thereof and being upright to hold a container therein in its normal upright position, a guide disposed below said runway for supporting the bottom of the container, a ramp extending through said guide and having an upwardly inclined surface, and means to advance said carriage towards said ramp to effect movement of the bottom of the container along said ramp and movement of the container in said basket.

6. A container washing machine comprising a runway, a carriage movable on said runway and arranged to carry a container with the container arranged slidable therein, a guide disposed below said runway, the container being disposed seated slidable on said guide, a ramp extending through said guide and having an upwardly inclined surface, and means to advance said carriage towards said ramp to effect guided seated movement of the container along said ramp and to effect vertical movement of the container in said carriage.

7. A container washing machine comprising a runway, a carriage movable on said runway, a ramp disposed extending above said runway to provide a support for a container in said carriage, said ramp comprising a member having a cam surface, a lever pivoted intermediate its ends, counterweight means on one end of said lever, said ramp being pivotally mounted on the other end of said lever, and spring means connecting said ramp and said lever.

8. In a container washing machine, a support to support a container having its bottom seated on said support, an elongated tube, a source of liquid in fluid communication with said tube, a bar secured in the lower end of said tube and extending downwardly therefrom, said bar being enterable in the container, said bar having its upper end forked to define a passage for fluid, and said bar having its outwardly extending portion twisted along its length to compel fluid passing therealong to follow a substantially spiral path, and means to revolve said tube.

9. A container washing machine comprising a runway, a carriage movable on said runway and adapted to contain a container, driving means to effect intermittent movement of said carriage, an elongated tube disposed extending above said carriage, a twisted bar secured to one end of said tube and enterable in the container, a source of liquid in fluid communication with said tube, means to revolve said tube, and means movable in timed relation to movement of said driving means to reciprocate said tube.

10. In a container washing machine, a support for a container, an elongated tube disposed extending above said support, a twisted bar secured to one end of said tube and enterable in the container with an end of said bar seated revolvable on the bottom of the container, a source of liquid in fluid communication with said tube, and means to revolve said tube.

11. A container washing machine comprising a movable abutment, a movable carriage disposed below said abutment, a basket on said carriage to contain a container slidable therein, means movable in said basket to engage the container and to elevate the container, means to move said abutment downwardly into engagement with said basket, an elongated tube disposed above said basket and through said abutment for guided movement thereby, a source of liquid in fluid communication with said tube, and means to oscillate said tube in said abutment for movement into and out of said container, respectively.

12. A container washing machine comprising a support, an elongated tubular basket on said support to contain a container, said basket having peripherally spaced and elongated internal ribs of substantial length adapted to maintain the container in spaced relation to the inner face of the basket and thereby define channels for liquid between the container and the inner face of the basket, a source of hot caustic liquid, a tube connected to said source and having an end disposed above and adjacent the mouth of said basket, control means movable to effect intermittent flow of liquid through said tube, and means movable in timed relation to movement of said control means to move said support.

13. A container washing machine comprising a carriage, a basket on said carriage to contain a container slidable therein, a movable abutment member disposed above said basket, resilient guide means on said basket to receive said abutment member to guide said abutment member, means entered in said basket to elevate a container in the basket, an elongated tube disposed above said basket and reciprocable through said abutment member, said tube being arranged enterable in the container, a source of liquid in fluid communication with said tube, driving means connected to produce intermittent movement of said carriage, and means connecting said driving means with said abutment member and with said tube to reciprocate said abutment member and said tube in timed relation to movement of said carriage.

14. In a container washing machine, a support, a tank on said support, a guide rod depending from said tank, a reciprocable bar having an end slidably engaging said rod, means to reciprocate said bar, a bearing on said tank, a first elongated tube depending from said tank and arranged revolvable in said bearing, said tube being provided with an elongated side slot, a second tube slidable in said first tube and extending in said tank, a collar slidable along said first tube, means extending through said slot and connecting said second tube with said collar, said bar being arranged movable in one direction of movement to engage said collar and to thereby effect lifting of said second tube.

15. A container washing machine comprising a support, a tank for liquid on said support, a bearing on said tank, a first elongated tube depending from said tank and arranged revolvable in said bearing, means to revolve said first tube, said first tube being provided with an elongated side slot, a second elongated tube slidable in said first tube, a collar movable along said first tube, means extending through said slot and connecting said second tube with said collar, said second tube being in fluid communication with liquid in said tank, a carriage to contain a container, a curved member on an end of said second tube and enterable in the container, driving means connected to effect intermittent movement of said carriage, and means connected with said driving means and engageable by said collar to effect movement of said second tube in timed relation to movement of said driving means.

16. A container washing machine comprising a support, a bearing on said support, a first elongated tube in said bearing, said first tube being provided with an elongated side slot, a second elongated tube slidable in said first tube, a collar movable along said first tube, means extending through said slot and connecting said second tube with said collar, a lifting member movable to engage said collar and lift said second tube in one direction of movement and to become disengaged from said collar in an opposite direction of movement, a carriage to contain a container, an end of said second tube being enterable in the container, driving means connected to effect intermittent movement of said carriage, and means connecting said driving means and said lifting member to effect movement of said lifting member in timed relation to movement of said driving means.

17. A container washing machine comprising a tank containing a liquid, a runway in said tank, carriages movable on said runway, baskets on said carriages, said baskets being adapted to contain containers slidable therein, said baskets being open at both ends, a guideway below said runway to support the bottoms of containers in said baskets, a tube disposed at a point above said tank, an elevated runway disposed below said tube and above said tank and operably connected with the runway in said tank, a guideway below said elevated runway, driving means connected effective to intermittently advance said carriages along said tank and along said elevated runway, cam means adjacent said elevated runway and enterable in said baskets to move containers in said baskets, a source of liquid in fluid communication with said tube, the end of said tube being adapted to enter a container, and means connected with said driving means to reciprocate said tube in timed relation to movement of said carriages.

18. In a container washing machine, an elongated tube, means to revolve said tube, a source of liquid in fluid communication with said tube, a curved member secured to an end of said tube and being provided with a slot, a thin rod entered in said tube, and means to produce relative longitudinal movement of said rod and said tube and effect movement of said rod in said slot.

19. A container washing machine comprising a tank, means to supply a substantially constant flow of liquid to said tank, a depending overflow pipe connected to said tank and adapted to carry liquid to wash a container placed below the lower end of said pipe, a tube reciprocable through the bottom of said tank, a movable support adapted to carry a first container disposed below said tube and a second container below said overflow pipe, means to intermittently move said support, said tube being arranged movable in one direction to raise its upper end above the liquid in said tank and to cut off fluid flow through the tube and to be moved in an opposite direction to place its upper end in the body of liquid in the tank and provide a fluid path shunting said overflow pipe, and means to reciprocate said tube in timed relation to movement of said carriage.

20. A container washing machine comprising a first tank containing hot caustic liquid, a second tank having an overflow conduit communicating with said first tank, a runway in said first tank and having a portion thereof arranged extending upwardly and outwardly to extend over said second tank, a carriage movable on said runway, a basket on said carriage to contain a container, means to advance said carriage from said first tank to a position over said second tank, and means to draw liquid from said first tank and to drop it by gravity over a container in a basket at said position and into said second tank.

21. In a container washing machine, a tank for liquid, means to maintain liquid at a predetermined height in said tank, a movable container carrier disposed in spaced opposed relation to said tank, a tube providing a conduit for liquid and slidable through the bottom wall of said tank to reciprocate in a container on said carrier, and means connected to reciprocate said tube in timed relation to movement of said carrier to effect intermittent elevating of an end of said tube above the liquid in said tank.

22. In a container washing machine, a container carrier intermittently movable, a tank for cleansing liquid above the path of said carrier, a tube depending from said tank, means to rotate said tube, a second tube inside the first tube, means to reciprocate said second tube above and below the liquid level in the tank and timed with the movement of said carrier so said second tube enters a container held by the carrier on its downward movement, and a connection between the tubes to cause rotation of the second tube.

23. In a container washing machine, a container carrier movable intermittently, a tube above the carrier, means to rotate the tube, means to reciprocate the tube in timed relation with movement of said carrier to cause the tube to enter and leave a carried container, a source of cleansing liquid in communication with said tube, and a fixed cleansing element extending into said tube to maintain a free passage through the tube.

24. In a container washing machine, a container carrier movable intermittently, a tube above the carrier, means to rotate the tube, means to reciprocate the tube, means to reciprocate the tube in timed relation with movement of said carrier to cause the tube to enter and leave a carried container, a source of cleansing liquid in communication with said tube, and a fixed cleansing element extending into said tube to maintain a free passage through the tube, and means associated with said carrier to cause movement of a container toward said tube relatively to said carrier.

WALDO F. FISCHER.

REFERENCES CITED

The following references are of record in the file of this patent:

UNITED STATES PATENTS

| Number | Name | Date |
|---|---|---|
| 127,410 | Fisher et al. | June 4, 1872 |
| 240,861 | Stoddard | May 1, 1881 |
| 733,558 | Schirmer | July 14, 1903 |
| 745,752 | Adams et al. | Dec. 1, 1903 |
| 833,637 | Sheffield | Oct. 16, 1906 |
| 897,998 | Otto | Sept. 8, 1908 |
| 899,017 | Arnold | Sept. 22, 1908 |
| 940,178 | Meyer | Nov. 16, 1909 |
| 993,027 | Cheney | May 23, 1911 |
| 1,216,666 | Dorsch | Feb. 20, 1917 |
| 1,273,602 | Gallup et al. | July 23, 1918 |
| 1,445,359 | Scarborough et al. | Feb. 13, 1923 |
| 1,618,821 | Gruetter | Feb. 22, 1927 |
| 1,625,930 | Astrom | Apr. 26, 1927 |
| 1,642,419 | Loew | Sept. 13, 1927 |
| 1,708,694 | Fischer | Apr. 9, 1929 |
| 1,734,585 | Ladewig et al. | Nov. 5, 1929 |
| 1,756,554 | Hippenmeyer | Apr. 29, 1930 |
| 1,787,984 | Hippenmeyer | Jan. 6, 1931 |
| 1,817,014 | Meyer et al. | Aug. 14, 1931 |
| 1,831,351 | Hippenmeyer | Nov. 10, 1931 |
| 1,853,917 | Meyer et al. | Apr. 12, 1932 |
| 1,904,685 | Gruetter | Apr. 18, 1933 |
| 1,906,974 | Ladewig et al. | May 2, 1933 |
| 1,934,247 | Wynne et al. | Nov. 7, 1933 |
| 1,940,615 | Webster | Dec. 19, 1933 |
| 1,978,721 | Perkins | Oct. 30, 1934 |
| 1,981,684 | Wynne | Nov. 20, 1934 |
| 2,013,032 | Chelle | Sept. 3, 1935 |
| 2,050,634 | Stegeman | Aug. 11, 1936 |
| 2,219,007 | Dostal | Oct. 22, 1940 |
| 2,225,429 | Dostal | Dec. 17, 1940 |

FOREIGN PATENTS

| Number | Country | Date |
|---|---|---|
| 168,755 | Great Britain | July 28, 1920 |
| 439,449 | Great Britain | Dec. 6, 1935 |